United States Patent [19]
Nishimura et al.

[11] Patent Number: 5,989,019
[45] Date of Patent: Nov. 23, 1999

[54] DIRECT REDUCTION METHOD AND ROTARY HEARTH FURNACE

[75] Inventors: Makoto Nishimura; Tomio Suzuki, both of Kobe, Japan

[73] Assignee: Kabushiki Kaisha Kobe Seiko Sho, Kobe, Japan

[21] Appl. No.: 08/906,598

[22] Filed: Aug. 6, 1997

[30] Foreign Application Priority Data

Aug. 15, 1996 [JP] Japan .................................. 8-215743

[51] Int. Cl.⁶ ........................................................ F27B 9/16
[52] U.S. Cl. .......................... 432/138; 432/124; 75/484
[58] Field of Search .................................. 432/138, 103, 432/104, 105, 161, 175, 179, 180, 181, 124, 144, 145, 146; 75/484

[56] References Cited

U.S. PATENT DOCUMENTS

| | | | |
|---|---|---|---|
| 3,652,426 | 3/1972 | Oleszko | 202/216 |
| 3,722,867 | 3/1973 | Butler | 423/175 |
| 4,354,828 | 10/1982 | Benton et al. | 432/145 |
| 4,462,793 | 7/1984 | Maeda et al. | 432/105 |
| 4,622,905 | 11/1986 | MacDougall et al. | 110/347 |
| 4,741,694 | 5/1988 | Mason et al. | 432/105 |
| 5,019,689 | 5/1991 | Bollier et al. | 219/388 |
| 5,102,330 | 4/1992 | Ho | 432/105 |
| 5,186,741 | 2/1993 | Kotraba et al. | 75/484 |
| 5,314,170 | 5/1994 | Tada et al. | 432/180 |
| 5,730,775 | 3/1998 | Meissner et al. | 75/436 |

*Primary Examiner*—Mark H. Paschall
*Assistant Examiner*—Jiping Lu
*Attorney, Agent, or Firm*—Oblon, Spivak, McClelland, Maier & Neustadt, P.C.

[57] ABSTRACT

In a rotary hearth furnace wherein objects including a mixture of a metal oxide, a reductant such as coal, and the like are fed onto the hearth, the fed objects are heated and reduced through the application of a flame of a burner provided on a ceiling portion or the upper portion of a side wall of the furnace, and the reduced objects are discharged from the furnace so as to be collected. The rotary hearth furnace has an air feeder for feeding air for secondary combustion at a position below the burner and in the vicinity of the hearth of the furnace for the purpose of burning a flammable gas generated from the objects. A flame of this secondary combustion accelerates the heating of the objects. Also, through a combined use of air for secondary combustion and excess air from the burner and an appropriate regulation of the ratio of therebetween, the objects are heated effectively.

10 Claims, 10 Drawing Sheets

CIRCULATING FLOW

F I G. 5
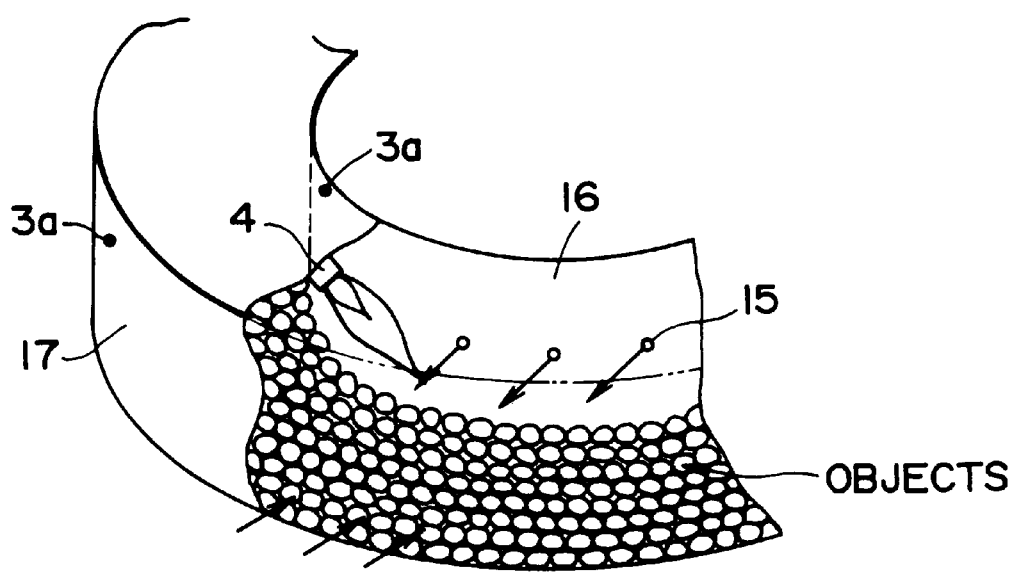

DIRECT REDUCTION METHOD AND ROTARY HEARTH FURNACE

BACKGROUND OF THE INVENTION

1. Field of the Invention

The present invention relates to a direct reduction process, and more particularly to a direct reduction method wherein a gas for secondary combustion is fed so as to burn a flammable gas generated from objects to be heated (hereinafter referred to merely as objects). The present invention also relates to a rotary hearth furnace for carrying out the direct reduction method.

2. Description of the Related Art

Conventionally, there is known a process where in a metal oxide or a mixture of a metal oxide, coal, etc. in the form of pellets, briquettes, or the like (hereinafter may generically be referred to as objects) is charged into a rotary hearth furnace to undergo direct reduction.

In the aforementioned rotary hearth furnace, heat is supplied to objects during a direct reduction steel-making process by a plurality of burners, such that the inside temperature of the face is maintained at 1200–1500° C.

In connection with direct reduction of this kind, there is known a method wherein a metal oxide which contains a reductant is supplied to a rotary-hearth type furnace and heated therein (e.g. U.S. Pat. No. 4,622,905). In the technique described in the publication, diversified burners are employed, and the (furnace is operated by mixed combustion with pulverized coal such that luminous flames are generated at or near an equivalent ratio.

According to U.S. Pat. No. 4,401,214, air is fed to burners only in an amount required to burn gas generated in association with reduction. The publication describes that the aforementioned atmosphere can be established by the use of gaseous or liquid fuel, and preheated combustion air.

According to the aforementioned conventional art, in manufacture of direct-reduced iron, air is fed in an equivalent amount into a furnace through the use of burners.

Also, two-stage combustion is conventionally performed in, for example, steel heating furnaces and boilers for the purpose of reducing the amount of generated NOx. There is also known a method wherein a flammable gas, which is generated within a furnace and contains $CO_2$ and $H_2$, is led into a separate secondary combustion furnace provided outside the furnace and is completely combusted therein.

In the case where a furnace is operated while the inside temperature of the furnace is maintained constant, as described above, a large amount of a flammable gas which contains CO, $H_2$, $CH_4$, etc. is generated when objects are charged into the furnace, and the amount of the flammable gas decreases with time. This phenomenon has been known in the past, and it has been a general practice to feed such a flammable gas into a separate furnace and burn the gas therein. Since no attention has been paid to such a flammable gas, such a flammable gas is not utilized for heating objects.

FIG. 12 illustrates two-stage combustion practiced in, for example, boilers. As shown in FIG. 12, a burner 30 is provided in each zone of a heating furnace, and fuel is fed through a nozzle 31. Air for combustion is divided into primary air 32 which is supplied through a clearance around the nozzle and secondary air which is fed from locations surrounding the clearance. Generally, the ratio of the amount of the primary air 32 to the amount of the secondary air is set at 0.6–0.8 to thereby establish reducing-gas atmosphere in a primary combustion zone through the generation of CO and $H_2$; the secondary air is fed from the locations surrounding the stream of the primary air 32 to thereby completely combust CO and $H_2$ generated in the primary combustion zone. Accordingly, combustion progresses slowly, so that the amount of generated fuel NOx and the amount of generated thermal NOx reduce significantly. However, in both excess-air-regulated combustion and two-stage combustion, no attempt is made to burn a flammable gas generated from objects in the vicinity of the objects.

SUMMARY OF THE INVENTION

The present invention has been accomplished in view of the above-mentioned problems involved in conventional combustion furnaces, and an object of the invention is to provide a direct reduction method wherein a flammable gas generated in association with reduction is burned efficiently so as to use the burning flammable gas as a heat source for heating objects to thereby decrease fuel consumption of burners of a rotary hearth furnace with a resultant decrease in the unit requirement of fuel.

Another object of the present invention is to provide a rotary hearth furnace for carrying out the above direct reduction method.

The present invention provides a direct reduction method comprising the steps of: feeding a rotary hearth furnace with objects including a mixture of a metal oxide, a reductant such as coal, and the like; heating and reducing the objects through the use of a heat of a burner provided on a ceiling portion or the upper portion of a side wall of the rotary hearth furnace; and discharging the reduced objects from the rotary hearth furnace for collection. In the direct reduction method, gas such as air for secondary combustion is fed into the rotary hearth furnace at a position below the burner and in the vicinity of a hearth of the furnace for the purpose of burning a flammable gas generated from the objects to thereby use the burning flammable gas as a heat source for heating the objects.

Preferably, the ratio of the amount of gas for primary combustion fed to the burner to the amount of gas for secondary combustion is regulated for the purpose of controlling temperature at a position in the vicinity of the objects. This control is preferably performed such that the unit requirement of fuel is minimized.

The present invention provides a rotary hearth furnace wherein objects including a mixture of a metal oxide, a reductant such as coal, and the like are fed onto a hearth, the fed objects are heated and reduced through the application of a flame of a burner provided on a ceiling portion or the upper portion of a side wall of the furnace, and the reduced objects are discharged from the furnace so as to be collected. The rotary hearth furnace has gas feed means for feeding gas for secondary combustion at a position below the burner and in the vicinity of the hearth of the furnace for the purpose of burning a flammable gas generated from the objects.

Preferably, partitions extend vertically downward from the ceiling portion such that the partitions and the burners are alternately disposed in order to divide the interior of the rotary hearth furnace into a plurality of combustion compartments. Each of the partitions may have the gas feed means. An example of such gas feed means is a plurality of nozzles arranged on a header.

Also, preferably, a vortex generating member for giving a vortex to the flammable gas is provided in combination with each of the partitions. An example of such a vortex generating member is a plate member having the same shape as that of the partition.

Examples of gas for secondary combustion used in the present invention include air and oxygen-rich gas.

In the present invention, the interior of the rotary hearth furnace is heated to and maintained at a temperature of 1200–1500°to C. for the purpose of reducing objects. Accordingly, a flammable gas generated from the objects is heated instantaneously to the same temperature as that of the objects. Generally, at temperatures higher than 600° C., the reaction rate of the flammable gas is relatively high and determined in accordance with the state of the mixing of the flammable gas and an oxidizing agent, which state, in turn, is governed by convection and diffusion. Thus, secondary combustion can be controlled through the use of a gas feeder dedicated to secondary combustion in addition to the use of excess air (gas) from the burners.

Further, since the gas feeder is located in the vicinity of objects, the mixing of the flammable gas and an oxidizing agent is accelerated, thereby burning the flammable gas efficiently. Thus, the burning flammable gas can be used as a heat source for heating the objects. Through this combined use of excess air from the burners and the gas feeder for secondary combustion and adequate control of the feed of the excess air and the gas for secondary combustion, the objects can be heated efficiently while fuel consumption is decreased.

BRIEF DESCRIPTION OF THE DRAWINGS

FIG. 5 is a perspective view, showing a further example of attachment of an oxidizing-agent feeder for secondary combustion;

DESCRIPTION OF THE PREFERRED EMBODIMENTS

Embodiments of the present invention will now be described with reference to the drawings.

Figure 1:
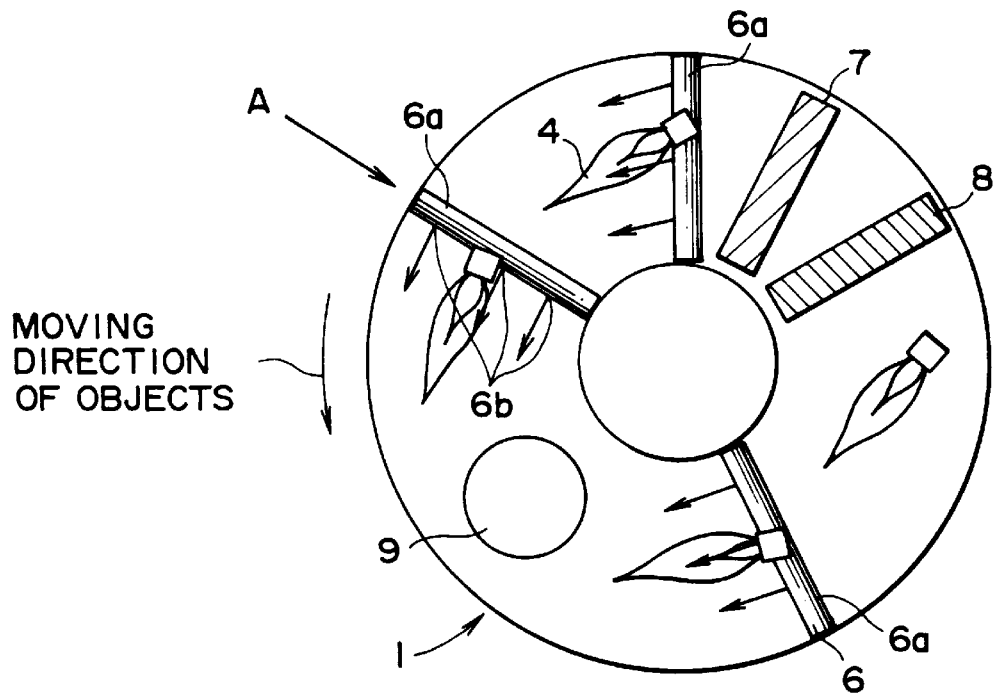
FIG. 1 is a plan view showing the structure of a first embodiment of a rotary hearth furnace according to the present invention.
Figure 2:
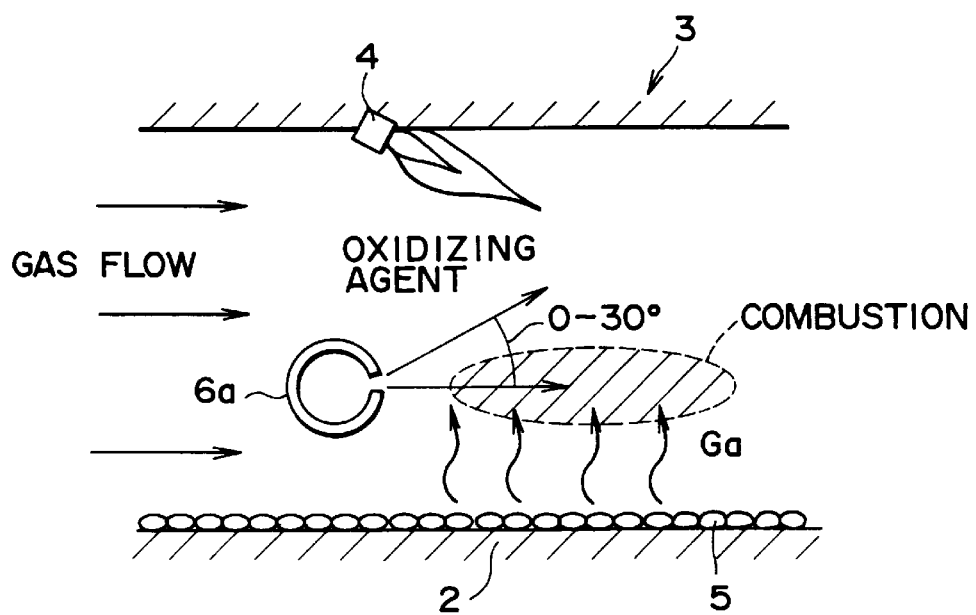
FIG. 2 is a front view of the rotary hearth furnace of FIG. 1, showing the location of an oxidizing-agent feeder for secondary combustion.

FIG. 1 shows a plan view of an embodiment of a rotary hearth furnace used for performing a direct reduction method of the present invention using air for secondary combustion. FIG. 2 shows a front view of the rotary hearth furnace as viewed in the direction of arrow A, showing essential portions of the rotary hearth furnace.

In a rotary hearth furnace shown in FIGS. 1 and 2, objects including a mixture of a metal oxide, coal, and the like are fed onto a hearth 2, the fed objects are heated and reduced through the application of flames of burners 4 provided on a ceiling portion 3 of the furnace 1, and the reduced objects are discharged from the furnace so as to be collected.

According to a feature of the present invention, an air feeder 6 for secondary combustion serving as gas feed means is provided at a position below the burners 4 and in the vicinity of the hearth 2 for the purpose of feeding air for secondary combustion of a flammable gas. The structures of the essential portions of the rotary hearth furnace 1 will now be described in detail.

In the rotary hearth furnace 1, objects 5 are charged from an object feeder 7 onto the hearth 2, and the fed objects 5 are heated on the hearth 2 by the burners 4 and are then collected by an object collector 8. Flammable gas Ga generated from the heated objects flows toward a flue 9.

The amount of the generated flammable gas Ga varies depending on place (time), and thus the amount of air to be fed for secondary combustion varies accordingly. The air feeder 6 for secondary combustion in the present embodiment is arranged so as to feed air to a position where the flammable gas Ga is generated. Specifically, in the rotary hearth furnace 2, three pipe-shaped headers 6a are radially provided. A plurality of nozzles 6b are arranged on each header 6a such that they are directed in the moving direction of the objects 5. The air feeders 6 for secondary combustion are located between the burners 4 and the objects 5 such that the air feeders 6 are offset toward the objects 5 (FIG. 2), so that air for secondary combustion can be fed for burning the flammable gas Ga generated from the objects 5.

Figure 3:
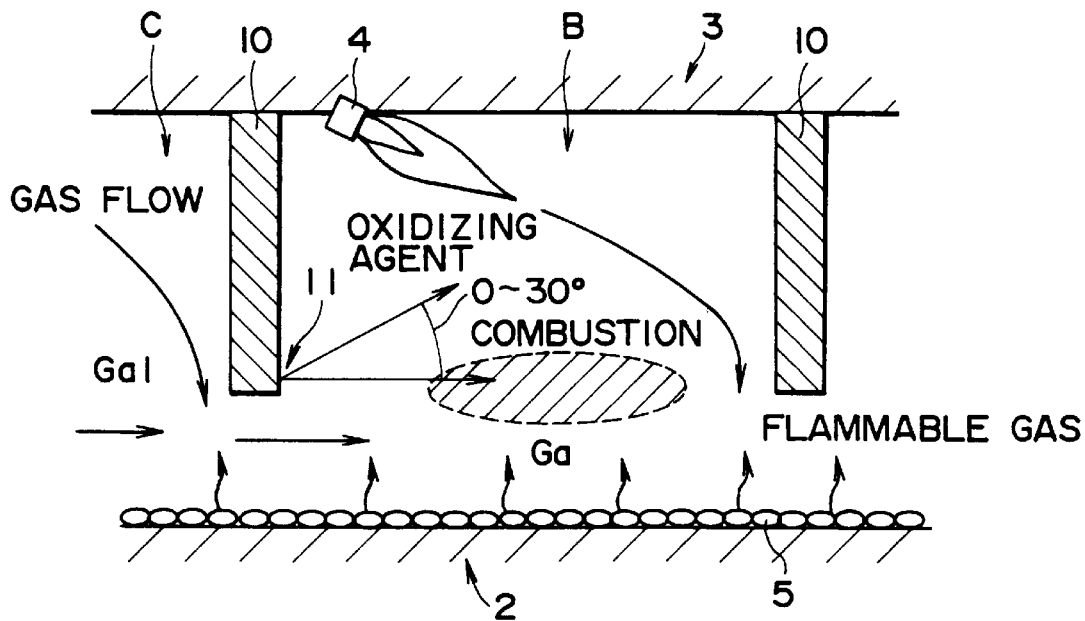
FIG. 3 is a view corresponding to FIG. 2, showing an example of attachment of an oxidizing-agent feeder for secondary combustion.

FIG. 3 shows a structure for controlling the temperature of the interior of the rotary hearth furnace 1. Partitions 10 are provided within the rotary hearth furnace 1 in order to divide the interior of the rotary hearth furnace 1 into a plurality of zones. An air feeder 11 for secondary combustion is provided in each of the partitions 10 so as to provide air for secondary combustion over an angular range from a horizontal direction to an upward angle of 30° with respect to the horizontal direction. This structure also enables the efficient combustion of flammable gas $Ga_1$ which flows from a zone C on the upstream side of the zone B.

Figure 6:
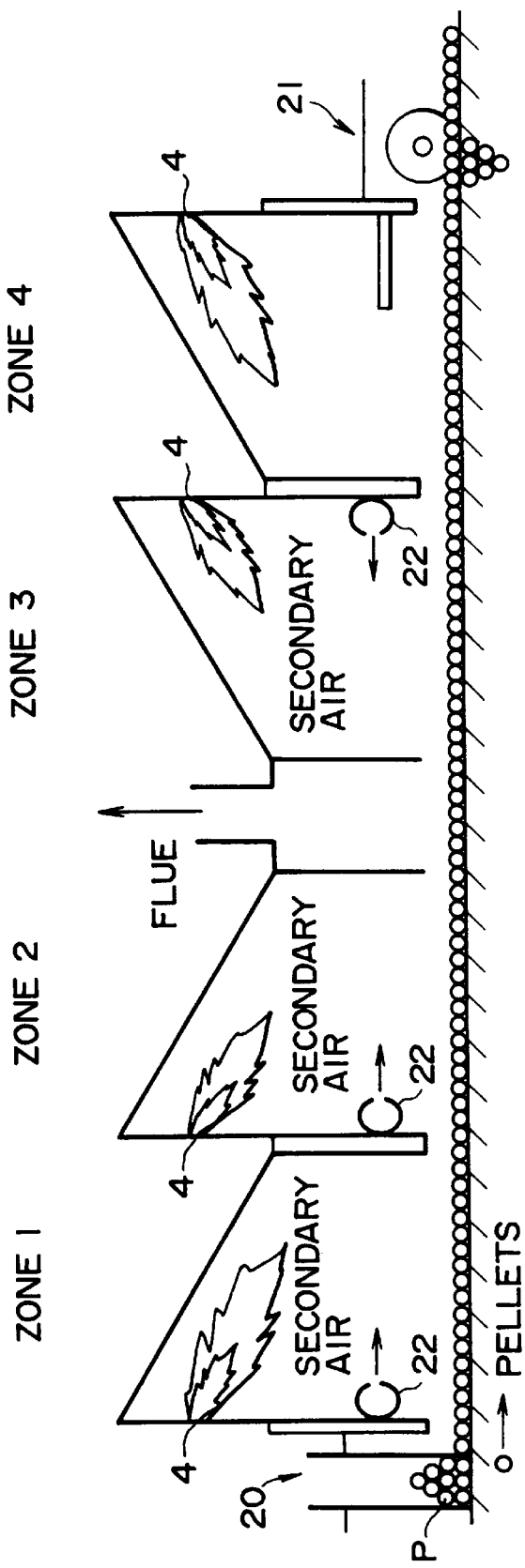
FIG. 6 is a development elevation of the rotary hearth furnace according to the present invention.
Figure 11:
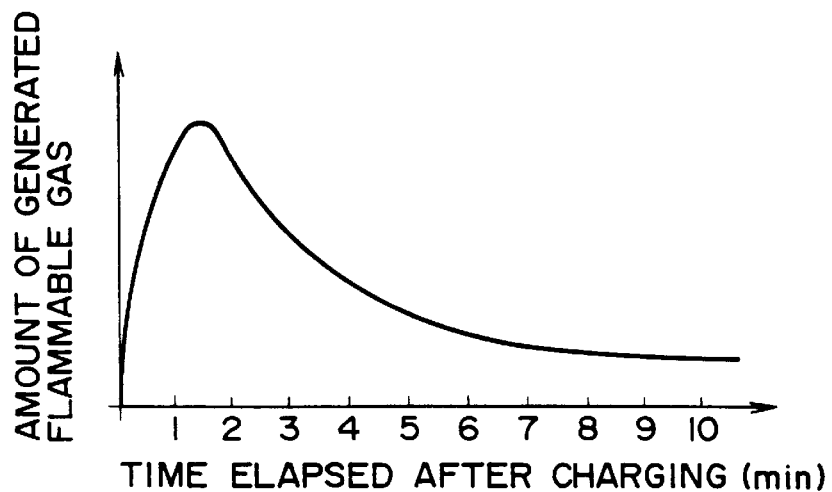
FIG. 11 is a graph representing the amount of a generated flammable gas with time after objects are charged into the furnace.
Figure 12:
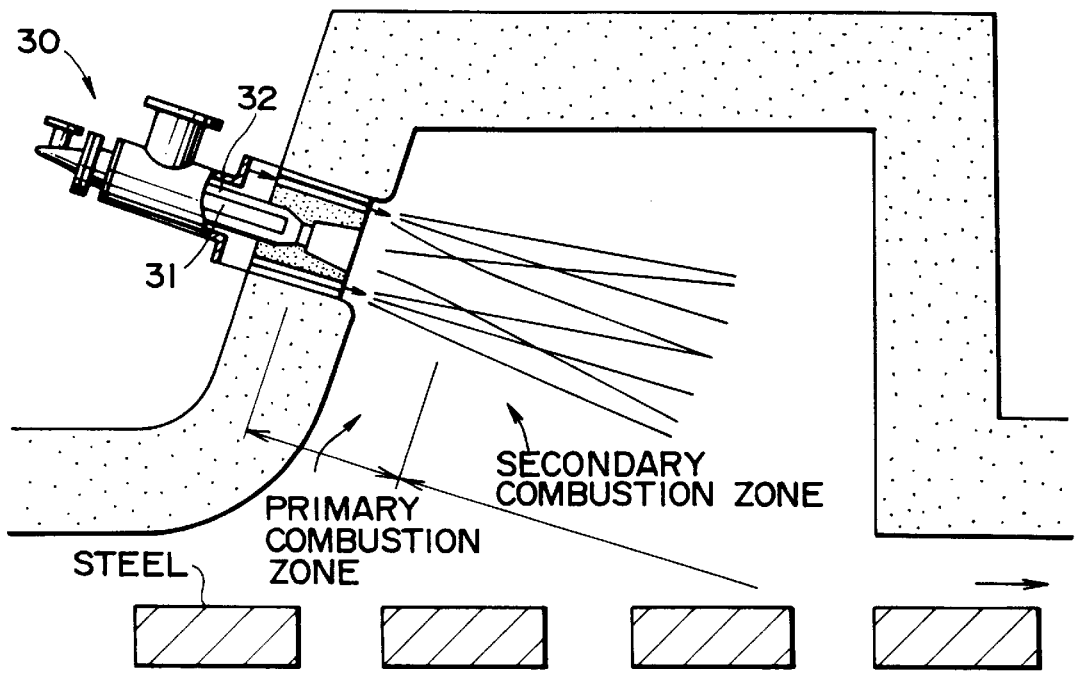
FIG. 12 is a sectional view depicting a conventional two-stage combustion method.

As shown in FIG. 11, a large amount of a flammable gas is generated in zones 1 and 2 immediately after the location where objects are charged into the rotary hearth furnace. Thus, as shown in FIG. 6, through the feed of air for secondary combustion at a downward angle with respect to the horizontal, secondary combustion can be accelerated efficiently without re-oxidizing the objects. On the other hand, at the latter half of heating of the objects as in zone 4 of FIG. 6, a discharge of air for secondary combustion toward the objects may reoxidize the reduced objects due to a relatively small amount of the generated flammable gas.

Figure 4:
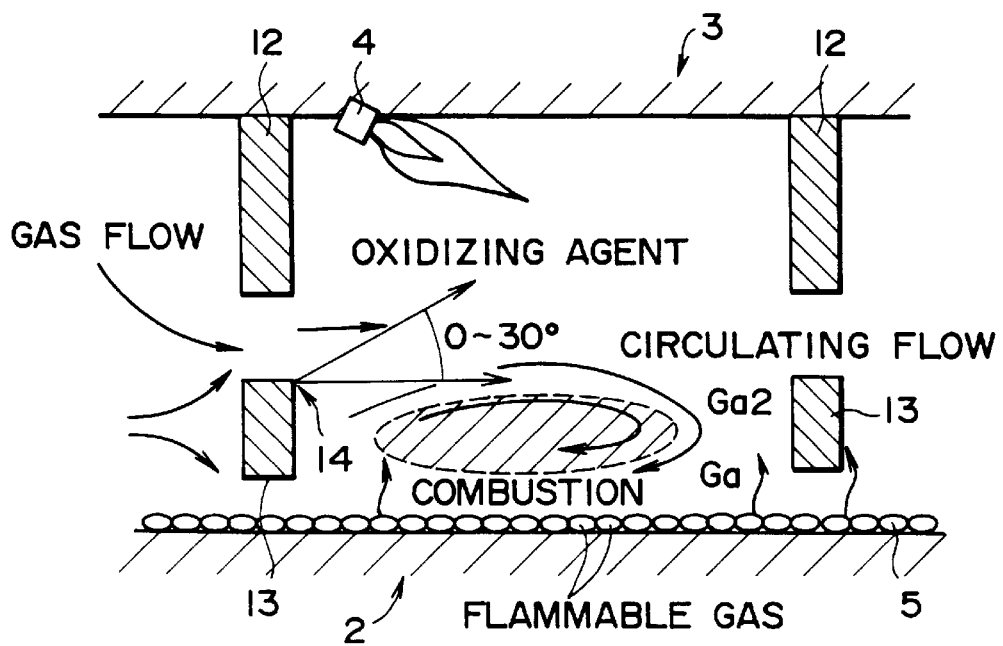
FIG. 4 is a view corresponding to FIG. 2, showing another example of attachment of an oxidizing-agent feeder for secondary combustion.

Like FIG. 3, FIG. 4 shows another structure for controlling the temperature of the interior of the rotary hearth furnace 1. Partitions 12 are provided within the rotary hearth furnace 1 in order to divide the interior of the rotary hearth furnace 1 into a plurality of zones. In addition, a secondary partition 13 serving as vortex-generating means is vertically provided under each of the partitions 12, and an air feeder 14 for secondary combustion is provided in the secondary partition 13. This structure causes a vortex $Ga_2$ to be formed on the downstream side of the secondary partition 13 in the direction of the gas flow, thereby elongating the convection time of a flammable gas. Accordingly, the flammable gas and air for secondary combustion are mixed in an accelerated manner, thereby feeding heat to the objects 5 in a more efficient manner.

FIG. 5 shows a structure in which air for secondary combustion is fed into the rotary hearth furnace 1 from walls of the rotary hearth furnace 1. This structure is effective in the case where the distance between the two walls of the rotary hearth furnace 1 is relatively small. Nozzle holes 15 for feeding air for secondary combustion are arranged on an inner wall 16 and an outer wall 17, thereby feeding air for secondary combustion into the rotary hearth furnace 1 in an opposed manner.

EXAMPLES

FIG. 6 shows the developed rotary hearth furnace 1, which is composed of four zones. In FIG. 6, pellets P charged from a feeder 20 are heated and reduced while they move through four zones, and the thus-reduced pellets P are discharged from a discharge 21.

Figure 7:
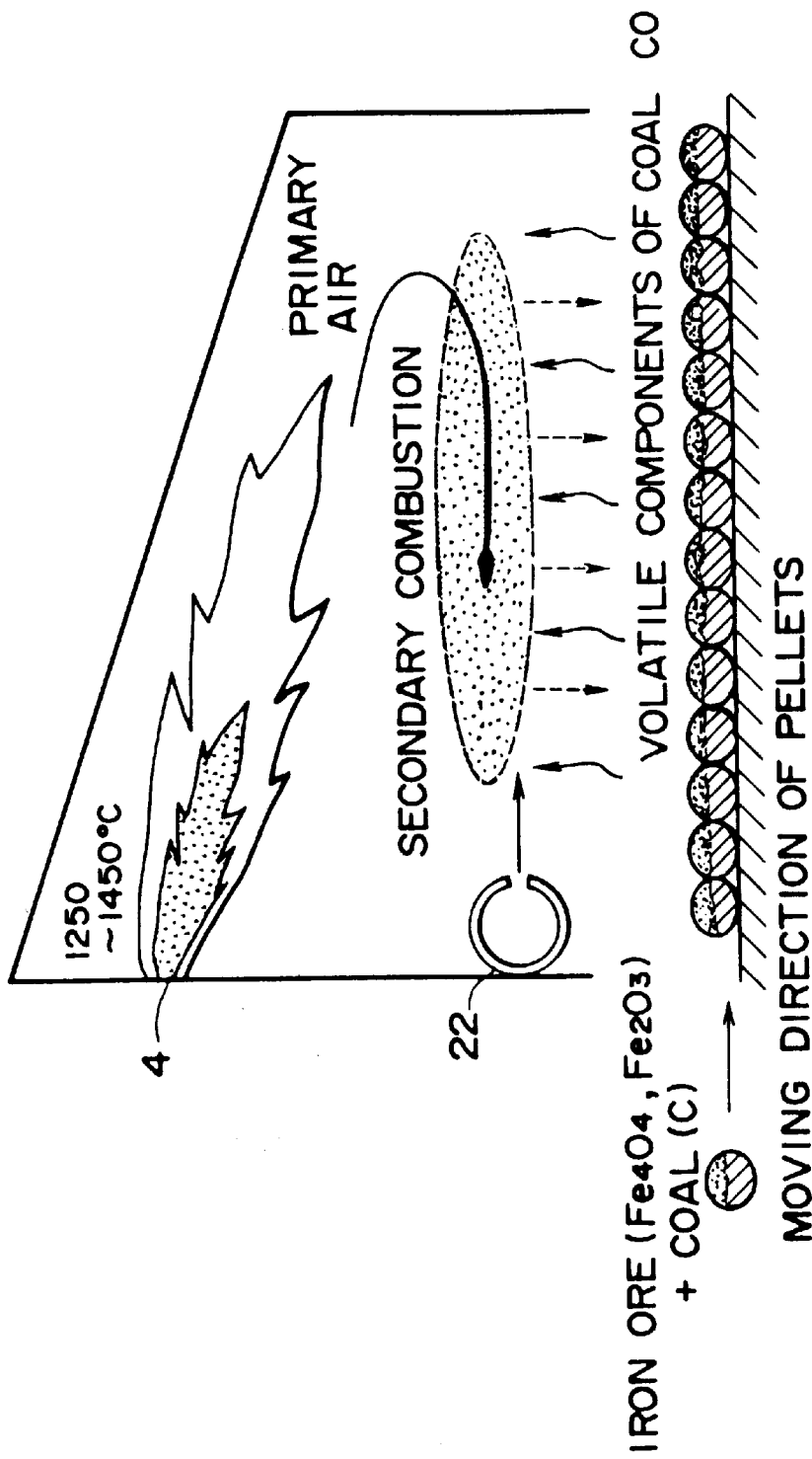
FIG. 7 is an enlarged view of one zone in the rotary hearth furnace of FIG. 6.

FIG. 7 shows one of zones 1 to 3 shown in FIG. 6. In FIG. 7, an air feeder 22 for secondary combustion is provided so as to feed air for secondary combustion in accordance with the amount of a flammable gas generated in the zone. In the illustrated structure, one air feeder 22 for secondary combustion is provided in the zone.

The interior of each zone 1 to 3 is controlled at a temperature of 1250–1450° C. Excess air obtained from the burner 4 and air for secondary combustion obtained from the air feeder 22 for secondary combustion are used for reaction with a flammable gas. In FIG. 7, air for secondary combustion is discharged in parallel with the moving direction of the pellets P. Thus, a flammable CO gas, which is generated in association with the combustion of the pellets P and drifts above the pellets P, undergoes secondary combustion through reaction with excess air and air for secondary combustion, so that the burning flammable CO gas can be utilized as a heat source for heating the pellets P.

In FIG. 6, zone 4 is not provided with the air feeder 22 for secondary combustion. This is because a flammable gas is hardly generated in the zone 4, which, therefore, requires no additional combustion other than combustion in an ordinary reducing atmosphere. However, the air feeder 22 for secondary combustion may be provided in the zone 4 as needed. The flue 9 is located substantially at the center among the zones 1–4 so as not to waste even a small amount of a flammable gas.

Figure 8A:
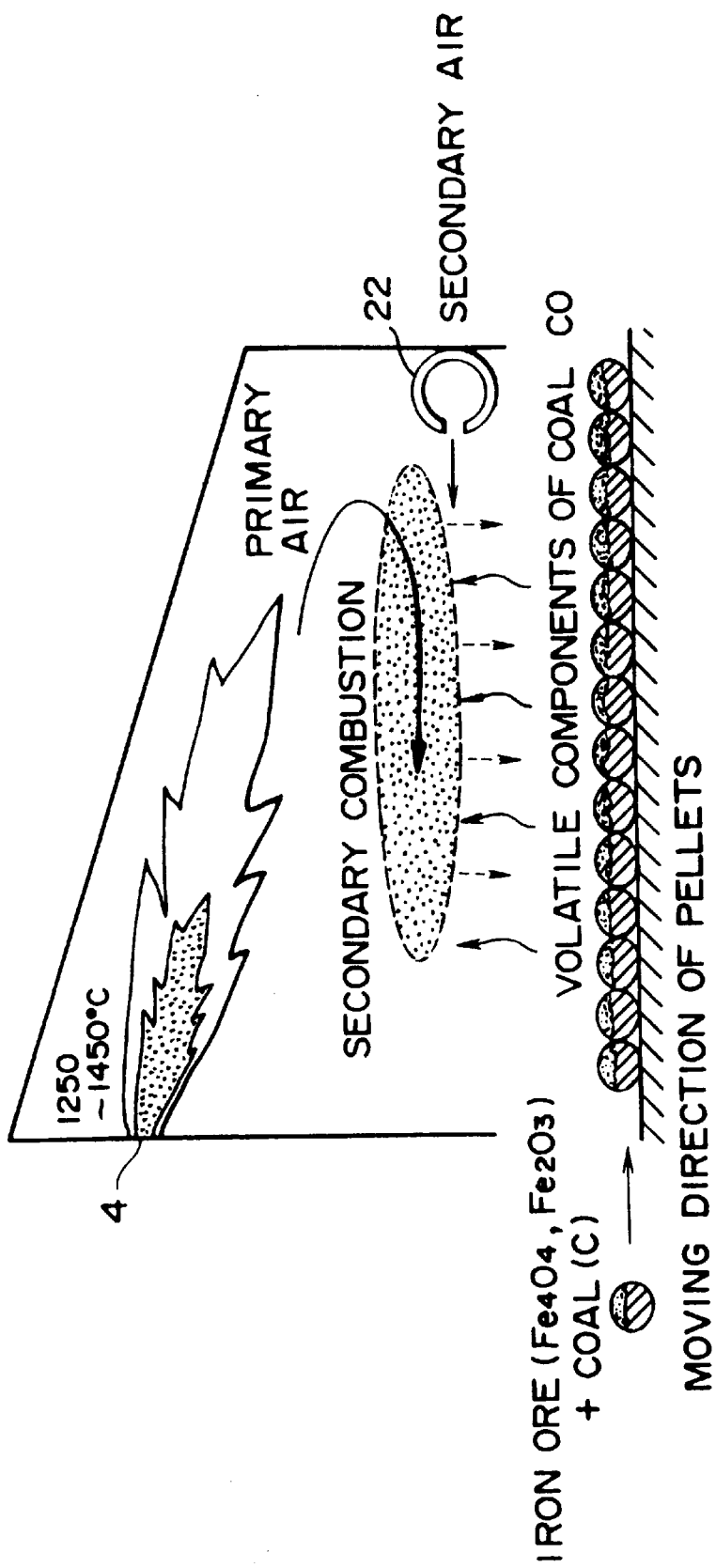
FIGS. 8A–8C are enlarged views each of which corresponds to FIG. 7 and which show modifications of the arrangement of the burner and an oxidizing-agent feeder for secondary combustion.
Figure 8B:
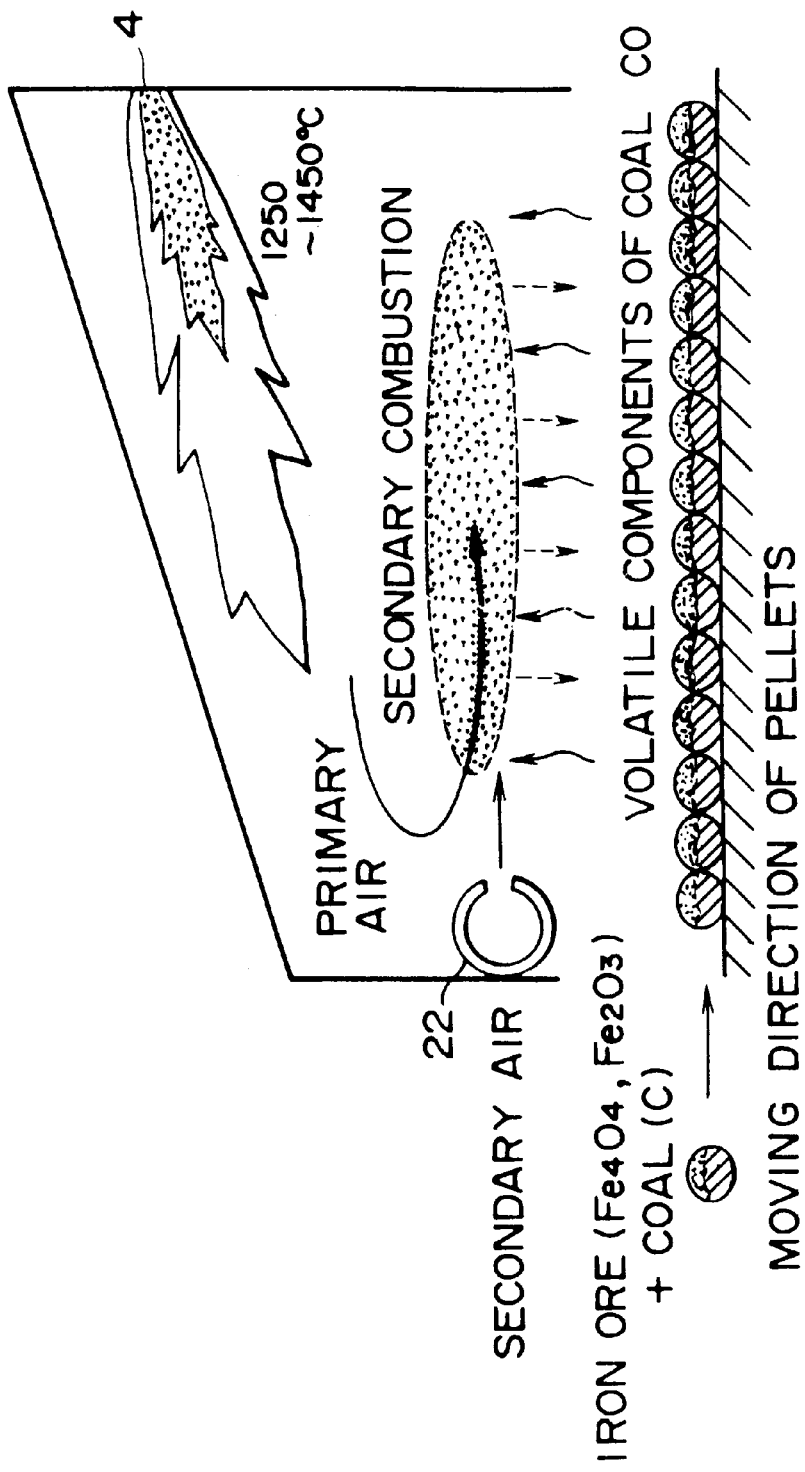
Figure 8C:
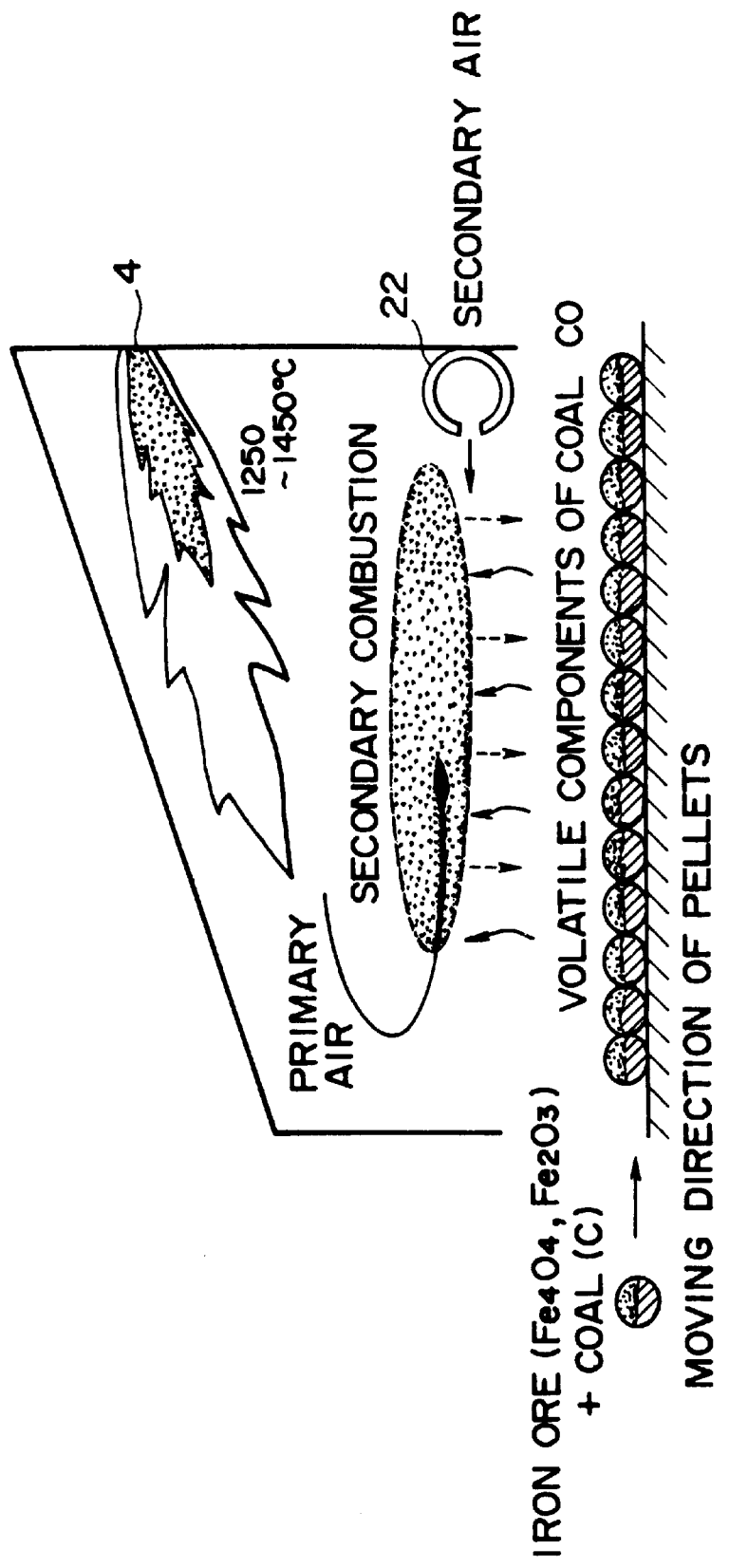

FIGS. 8A to 8C show modified arrangements of the air feeder 22 for secondary combustion.

In FIG. 8A, the air feeder 22 for secondary combustion is located on the downstream side in a zone in the moving direction of the pellets P.

In FIG. 8B, the burner 4 is arranged such that the flame thereof is directed opposite to the moving direction of the pellets P.

In FIG. 8C, the burner 4 is arranged such that the flame thereof is directed opposite to the moving direction of the pellets P, and the air feeder 22 for secondary combustion is located on the downstream side in a zone in the moving direction of the pellets P.

Figure 9:
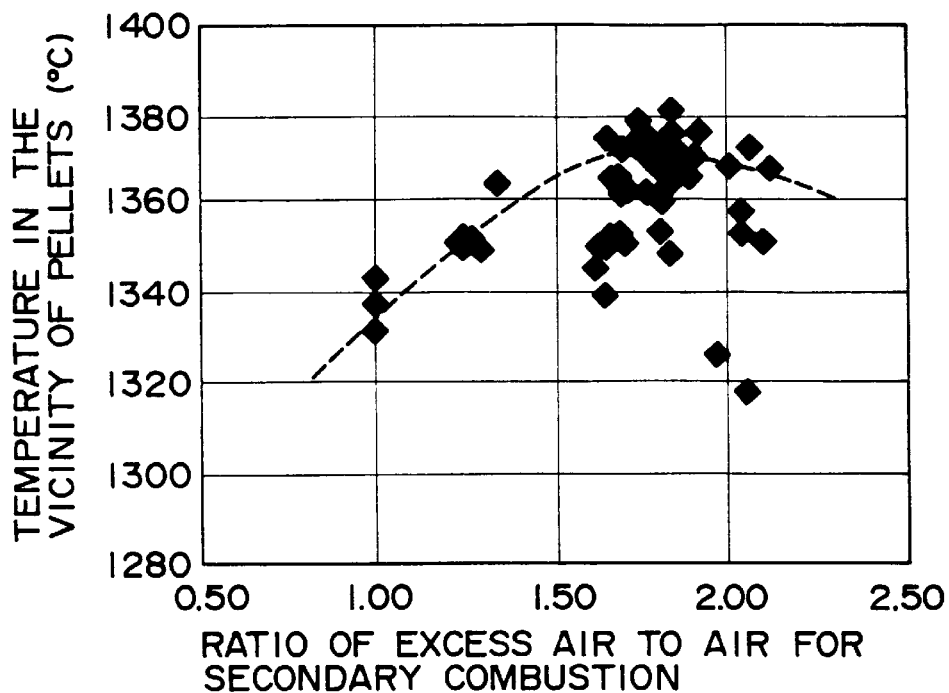
FIG. 9 is a graph showing the ratio of the amount of excess air to the amount of air for secondary combustion vs. temperature measured in the vicinity of pellets in the rotary hearth furnace according to the present invention.

An experiment was conducted in which pellets of a mixture of iron ore, which were objects to be heated, were heated and reduced in a rotary hearth furnace which had an outer diameter of 8.7 m and an inner diameter of 5.8 m and whose inside temperature was maintained at 1350–1450° C. The results of this experiment are shown in FIG. 9. FIG. 9 shows the ratio of the amount of excess air to the amount of air for secondary combustion vs. temperature measured in the vicinity of the pellets. As seen from FIG. 9, by controlling the amount of air for secondary combustion such that the air-amount ratio falls in the range of 1.5–1.8, a desirable atmospheric temperature is established in the vicinity of the pellets.

Figure 10:
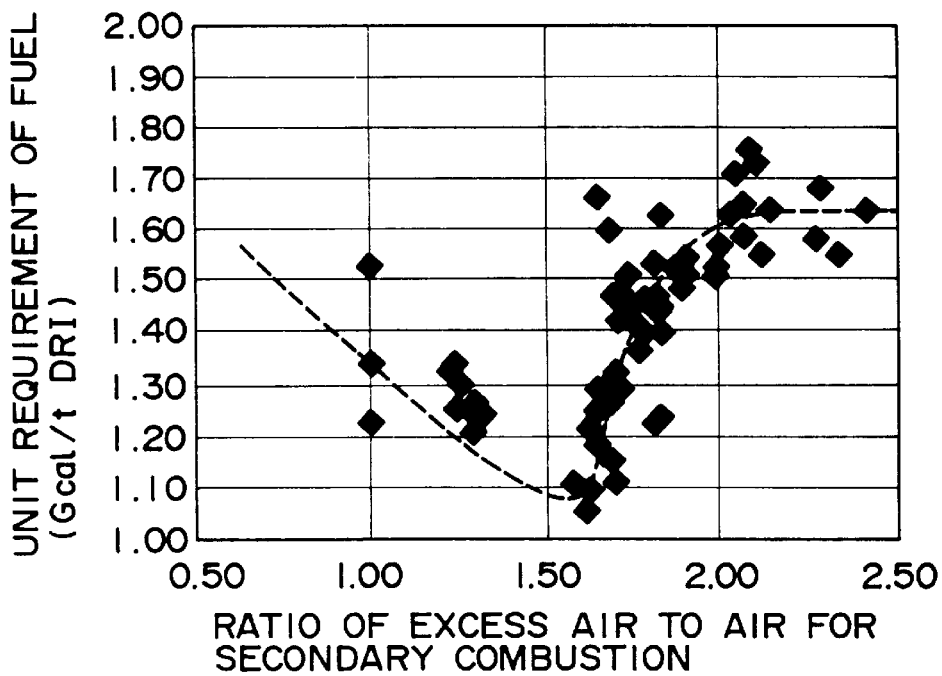
FIG. 10 is a graph showing the ratio of the amount of excess air to the amount of air for secondary combustion vs. the unit requirement of fuel in the rotary hearth furnace according to the present invention.

FIG. 10 shows the ratio of the amount of excess air to the amount of air for secondary combustion vs. the unit requirement of fuel. As seen from FIG. 10, the unit requirement of fuel is minimized when the air-amount ratio is near 1.6. When the air-amount ratio is 1.4–1.7, the unit requirement of fuel decreases in an amount of 30–50% as compared with the case where the air-amount ratio is 2.0 or greater, i.e. air is fed mainly from the burner. Likewise, the unit requirement of fuel is expected to decrease in an amount of 30–50% as compared with the case where air for secondary combustion is shut off so that air is fed only from the burner.

The ratio of the amount of excess air to the amount of air for secondary combustion, which ratio has an effect on a decrease in the unit requirement of fuel, depends on the composition of objects, the amount of fed objects, the shape of a furnace, and the temperature of the interior of the furnace, but follows the tendencies represented by the graphs of FIGS. 9 and 10, indicating the presence of a desirable range of the air-amount ratio.

Accordingly, through the regulation of an air flow to the burner and to the air feeder for secondary combustion, the temperature in the vicinity of objects can be controlled so as to decrease the unit requirement of fuel.

As is apparent from the above description, since the direct reduction method of the present invention employs secondary combustion which is performed in the vicinity of objects through the feed of air for secondary combustion, flames produced by the secondary combustion accelerate the heating of the objects.

Also, through the proper regulation of the ratio of the amount of air for secondary combustion and the amount of excess air from the burner, objects can be efficiently heated, thereby decreasing the unit requirement of fuel.

What is claimed is:

1. A rotary hearth furnace comprising:

a rotary hearth rotatable for moving objects thereon in a direction of rotation from an object feeder toward an object collector;

burners located above the hearth at at least two locations spaced in the direction of rotation, to provide flames to thereby heat and reduce the objects which release a combustible gas; and means for feeding a gas for secondary combustion above the objects on the hearth and below at least one of the burners to combust the combustible gas, and not for feeding a gas for secondary combustion above the objects on the hearth and below a downstream most one of said burners.

2. The rotary hearth furnace of claim 1 including a flue for discharging gas from the furnace, the flue being located substantially diametrically opposite one of the object feeder and the object collector.

3. A rotary hearth furnace comprising:

a rotary hearth rotatable for moving objects thereon in a direction of rotation from an object feeder toward an object collector;

burners located above the hearth at at least two locations spaced in the direction of rotation, to provide flames to thereby heat and reduce the objects which release a combustible gas;

means for feeding a gas for secondary combustion above the objects on the hearth and below at least one of the burners to combust the combustible gas; and partitions dividing the furnace into a plurality of combustion compartments, said partitions being arranged such that the objects on the hearth move sequentially through the combustion compartments, wherein said means for feeding a gas for secondary combustion are not located in a downstream most one of said compartments.

4. A rotary hearth furnace according to claim 3, each of said partitions comprises said gas feed means.

5. A rotary hearth furnace according to claim 4, including a vortex-generating member for giving a vortex to the flammable gas is provided in combination with each of said partitions.

6. A rotary hearth furnace according to claim 3, each of said partitions comprises said gas feed means.

7. A rotary hearth furnace according to claim 6, including a vortex-generating member for giving a vortex to the flammable gas provided in combination with each of said partitions.

8. A rotary hearth furnace according to claim 3, a vortex-generating member for giving a vortex to the flammable gas is provided in combination with each of said partitions.

9. A rotary hearth furnace comprising a rotary hearth rotatable for moving objects thereon in a direction of rotation from an object feeder toward an object collector;

burners located above the hearth at at least two locations spaced in the direction of rotation, to provide flames to thereby heat and reduce the objects which release a combustible gas;

means for feeding a gas for secondary combustion above the objects on the hearth and below at least one of the burners to combust the combustible gas; and partitions dividing the furnace into a plurality of combustion compartments, said partitions being arranged such that the objects on the hearth move sequentially through the combustion compartments, wherein said means for feeding a gas for secondary combustion are not located in a downstream most one of said compartments, further including a flue for discharging gas from the furnace, wherein the flue is not located in a downstream most one of said compartments.

10. A direct reduction method comprising the steps of:

feeding objects including a metal oxide and a reductant onto a rotary hearth of a rotary hearth furnace at an object feeder;

moving the objects through the rotary hearth furnace in a direction of rotation from an object feeder to an object collector;

discharging the objects from the rotary hearth at the object collector;

applying flames from burners located above the objects on the hearth at at least two locations spaced in the direction of rotation, to thereby heat and reduce the objects which release a combustible gas; and feeding a gas for secondary combustion above the objects on the hearth and below at least one of the burners to combust the combustible gas, and not feeding a gas for secondary combustion above the objects on the hearth and below a downstream most one of said burners.

* * * * *